US012483046B2

(12) United States Patent
Gao et al.

(10) Patent No.: US 12,483,046 B2
(45) Date of Patent: Nov. 25, 2025

(54) DISTRIBUTED LOW VOLTAGE POWER GENERATION ARCHITECTURE FOR BATTERY ELECTRIFIED AIRCRAFT

(71) Applicant: Wisk Aero LLC, Mountain View, CA (US)

(72) Inventors: Rui Gao, Santa Clara, CA (US); Michael John Burgart, Los Altos, CA (US); Geoffrey Alan Long, Montara, CA (US)

(73) Assignee: Wisk Aero LLC, Mountain View, CA (US)

(*) Notice: Subject to any disclaimer, the term of this patent is extended or adjusted under 35 U.S.C. 154(b) by 168 days.

(21) Appl. No.: 18/528,448

(22) Filed: Dec. 4, 2023

(65) Prior Publication Data

US 2024/0186802 A1 Jun. 6, 2024

Related U.S. Application Data

(60) Provisional application No. 63/430,313, filed on Dec. 5, 2022.

(51) Int. Cl.
*H02J 7/00* (2006.01)

(52) U.S. Cl.
CPC ........ *H02J 7/0024* (2013.01); *H02J 7/00714* (2020.01); *H02J 2207/20* (2020.01); *H02J 2310/44* (2020.01)

(58) Field of Classification Search
CPC ..................................................... H02J 7/0024
USPC ........................................................... 307/71
See application file for complete search history.

(56) References Cited

U.S. PATENT DOCUMENTS

| 10,940,771 | B1 | 3/2021 | Fatemi et al. |
| 2020/0021120 | A1 | 1/2020 | Koerner et al. |
| 2022/0127011 | A1 | 4/2022 | Long et al. |
| 2022/0231537 | A1* | 7/2022 | Hirota ...................... H02J 7/16 |

FOREIGN PATENT DOCUMENTS

WO 2022129538 A1 6/2022

OTHER PUBLICATIONS

PCT/US2023/082363, "International Search Report and Written Opinion", Apr. 1, 2024, 11 pages.

* cited by examiner

*Primary Examiner* — Daniel Kessie
*Assistant Examiner* — Dru M Parries
(74) *Attorney, Agent, or Firm* — Kilpatrick Townsend & Stockton LLP

(57) ABSTRACT

Power distribution systems, battery packs, and batteries employ battery modules that are connected in series to generate a high-voltage output and in parallel to generate a low-voltage output. A battery includes battery modules and a direct current to direct current converter. The battery modules are electrically connected in series to generate a first battery high-voltage output. The battery modules are electrically connected in parallel to generate a battery modules low-voltage output. The direct current to direct current converter generates a battery low-voltage output from the battery modules low-voltage output.

16 Claims, 6 Drawing Sheets

DISTRIBUTED LOW VOLTAGE POWER GENERATION ARCHITECTURE FOR BATTERY ELECTRIFIED AIRCRAFT

CROSS-REFERENCE TO RELATED APPLICATIONS

This application claims priority to U.S. Provisional Application No. 63/430,313, filed Dec. 5, 2022, the disclosure of which is incorporated herein by reference.

BACKGROUND

Aircraft typically include a variety of powered systems and devices, such as propulsion systems, avionics, control surfaces, lights, high-lift devices, and passenger systems and devices. The powered systems and devices typically have different power requirements. In battery electrified aircraft, the different power requirements may result in different voltages being used to supply electrical power to the powered systems and devices. For example, a relatively high voltage may be used to supply electrical power to high power consumption systems such as propulsion systems (e.g., lift/thrust fan units). A relatively low voltage may be used to supply electrical power to lower power consumption systems such as avionics, control surfaces, lights, and passenger systems and devices. Employing both high voltage and low voltage in a battery electrified aircraft, however, presents challenges with respect to satisfying aircraft design requirements, such as safety, weight, cost to produce the aircraft, and cost to operate the aircraft.

BRIEF SUMMARY

The following presents a simplified summary of some embodiments of the invention to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

Power distribution systems, battery packs, and batteries are presented that supply both high-voltage electrical power and low-voltage electrical power. In one example, an aircraft power distribution system is configured to supply high-voltage electrical power to propulsion loads and low-voltage electrical power to system loads. The aircraft power distribution system includes batteries with each of the batteries including battery modules. The battery modules are electrically connected in series to generate a high-voltage output. The battery modules are also electrically connected in parallel to generate a low-voltage output. The parallel connection between the battery modules can employ passive current flow-control components (e.g., diodes) to distribute contributions to the low-voltage output amongst the battery modules based on voltages of the battery modules to preferentially discharge battery modules having a higher state of charge. The battery can include a direct current to direct current converter to generate a low-voltage output for the battery from the combined output of the battery modules. The direct current to direct current converter can be configured to implement a voltage droop in the low-voltage output for the battery to provide for passive balancing with the low-voltage output(s) of one or more other batteries to preferentially discharge batteries with a higher state of charge. The output from two or more batteries can be combined to provide fail-safe redundancy in the supply of power from the two or more batteries in the event of the failure of one of the two or more batteries.

Thus, in one aspect, an aircraft power distribution system for supplying electrical power to high-voltage propulsion loads and low-voltage system loads includes a battery pack, a first power distribution unit, and a second power distribution unit. The battery pack includes a first battery and a second battery. The first battery includes first battery modules and a first direct current to direct current converter. The second battery includes second battery modules and a second direct current to direct current converter. The first battery modules are electrically connected in series to generate a first battery high-voltage output. The second battery modules are electrically connected in series to generate a second battery high-voltage output. The first battery high-voltage output and the second battery high-voltage output are used to supply power to a set of the high-voltage propulsion loads. The first battery modules are electrically connected in parallel to generate a first battery modules low-voltage output. The first direct current to direct current converter generates a first battery low-voltage output from the first battery modules low-voltage output. The second battery modules are electrically connected in parallel to generate a second battery modules low-voltage output. The second direct current to direct current converter generates a second battery low-voltage output from the second battery modules low-voltage output. The first power distribution unit distributes the first battery low-voltage output to a first set of the low-voltage system loads. The second power distribution unit distributes the second battery low-voltage output to a second set of the low-voltage system loads.

Each of the first battery and the second battery can include any suitable number of battery modules. For example, the first battery can include two, three, four, five, six, or more of the first battery modules. Likewise, the second battery can include two, three, four, five, six, or more of the second battery modules.

The first battery high-voltage output and the second battery high-voltage output can be combined in any suitable manner. For example, the first battery high-voltage output and the second battery high-voltage output can be electrically connected in parallel to generate a battery pack high-voltage output that is supplied to the set of the high-voltage propulsion loads. In another example, the first battery high-voltage output and the second battery high-voltage output can be electrically connected in series to generate a battery pack high-voltage output that is supplied to the set of the high-voltage propulsion loads.

Current flow-control components, such as diodes, can be employed to passively control discharging of the battery modules to preferentially discharge battery modules having a higher state of charge. For example, the first battery can include first current flow-control components (e.g., diodes) connected between the first battery modules low-voltage output and the first battery modules to block flow of current from the first battery modules low-voltage output to first battery modules and distribute contributions by the first battery modules to the first battery modules low-voltage output based on output voltages of the first battery modules. The second battery can include second current flow-control components (e.g., diodes) connected between the second battery modules low-voltage output and the second battery modules to block flow of current from the second battery modules low-voltage output to second battery modules and distribute contributions by the second battery modules to the second battery modules low-voltage output based on output voltages of the second battery modules.

Each of the first battery and the second battery can incorporate a voltage droop into the respective low-voltage output to provide for passive balancing of discharging of the first battery and the second battery. For example, the first direct current to direct current converter can be configured to generate the first battery low-voltage output from the first battery modules low-voltage output to produce a first voltage droop in the first battery low-voltage output. The second direct current to direct current converter can be configured to generate the second battery low-voltage output from the second battery modules low-voltage output to produce a second voltage droop in the second battery low-voltage output.

The aircraft power distribution system can further include a second battery pack, a third power distribution unit, and a fourth power distribution unit. The second battery pack can include a third battery and a fourth battery. The third battery can include third battery modules and a third direct current to direct current converter. The fourth battery can include fourth battery modules and a fourth direct current to direct current converter. The third battery modules can be electrically connected in series to generate a third battery high-voltage output. The fourth battery modules can be electrically connected in series to generate a fourth battery high-voltage output. The third battery high-voltage output and the fourth battery high-voltage output can be used to supply power to a second set of the high-voltage propulsion loads. The third battery modules can be electrically connected in parallel to generate a third battery modules low-voltage output. The third direct current to direct current converter can be configured to generate a third battery low-voltage output from the third battery modules low-voltage output. The fourth battery modules can be electrically connected in parallel to generate a fourth battery modules low-voltage output. The fourth direct current to direct current converter can be configured to generate a fourth battery low-voltage output from the fourth battery modules low-voltage output. The third power distribution unit can be configured to distribute the third battery low-voltage output to a third set of the low-voltage system loads. The fourth power distribution unit can be configured to distribute the fourth battery low-voltage output to a fourth set of the low-voltage system loads.

The aircraft power distribution system can be configured to provide redundancy in the distribution of electrical power. For example, the first power distribution unit, the second power distribution unit, the third power distribution unit, and the fourth power distribution unit can be electrically connected with the low-voltage system loads so that each of the low-voltage system loads is supplied power by at least two of the first power distribution unit, the second power distribution unit, the third power distribution unit, and the fourth power distribution unit.

Each of the third battery and the fourth battery can include any suitable number of battery modules. For example, the third battery can include two, three, four, five, six, or more of the third battery modules. Likewise, the fourth battery can include two, three, four, five, six, or more of the fourth battery modules.

The third battery high-voltage output and the fourth battery high-voltage output can be combined in any suitable manner. For example, the third battery high-voltage output and the fourth battery high-voltage output can be electrically connected in parallel to generate a second battery pack high-voltage output that is supplied to the second set of the high-voltage propulsion loads. In another example, the third battery high-voltage output and the fourth battery high-voltage output can be electrically connected in series to generate a second battery pack high-voltage output that is supplied to the second set of the high-voltage propulsion loads.

Current flow-control components, such as diodes, can be employed to passively control discharging of the third and fourth battery modules to preferentially discharge battery modules having a higher state of charge. For example, the third battery can include third current flow-control components (e.g., diodes) connected between the third battery modules low-voltage output and the third battery modules to block flow of current from the third battery modules low-voltage output to third battery modules and distribute contributions by the third battery modules to the third battery modules low-voltage output based on output voltages of the third battery modules. The fourth battery can include fourth current flow-control components (e.g., diodes) connected between the fourth battery modules low-voltage output and the fourth battery modules to block flow of current from the fourth battery modules low-voltage output to fourth battery modules and distribute contributions by the fourth battery modules to the fourth battery modules low-voltage output based on output voltages of the fourth battery modules.

Each of the third battery and the fourth battery can incorporate a voltage droop into the respective low-voltage output to provide for passive balancing of discharging of the third battery and the fourth battery. For example, the third direct current to direct current converter can be configured to generate the third battery low-voltage output from the third battery modules low-voltage output to produce a third voltage droop in the third battery low-voltage output. The fourth direct current to direct current converter can be configured to generate the fourth battery low-voltage output from the fourth battery modules low-voltage output to produce a fourth voltage droop in the fourth battery low-voltage output.

In another aspect, a battery pack includes a first battery and a second battery. The first battery includes first battery modules and a first direct current to direct current converter. The first battery modules are electrically connected in series to generate a first battery high-voltage output. The first battery modules are electrically connected in parallel to generate a first battery modules low-voltage output. The first direct current to direct current converter is configured to generate a first battery low-voltage output from the first battery modules low-voltage output. The second battery includes second battery modules and a second direct current to direct current converter. The second battery modules are electrically connected in series to generate a second battery high-voltage output. The second battery modules are electrically connected in parallel to generate a second battery modules low-voltage output. The second direct current to direct current converter is configured to generate a second battery low-voltage output from the second battery modules low-voltage output.

Each of the first battery and the second battery in the battery pack can include any suitable number of battery modules. For example, the first battery can include two, three, four, five, six, or more of the first battery modules. Likewise, the second battery can include two, three, four, five, six, or more of the second battery modules.

The first battery high-voltage output and the second battery high-voltage output in the battery pack can be combined in any suitable manner. For example, the first battery high-voltage output and the second battery high-voltage output can be electrically connected in parallel to generate a battery pack high-voltage output. In another example, the first battery high-voltage output and the second battery high-voltage output can be electrically connected in series to generate a battery pack high-voltage output.

Current flow-control components, such as diodes, can be employed in the battery pack to passively control discharging of the battery modules to preferentially discharge battery modules having a higher state of charge. For example, the first battery can include first current flow-control components (e.g., diodes) connected between the first battery modules low-voltage output and the first battery modules to block flow of current from the first battery modules low-voltage output to first battery modules and distribute contributions by the first battery modules to the first battery modules low-voltage output based on output voltages of the first battery modules. The second battery can include second current flow-control components (e.g., diodes) connected between the second battery modules low-voltage output and the second battery modules to block flow of current from the second battery modules low-voltage output to second battery modules and distribute contributions by the second battery modules to the second battery modules low-voltage output based on output voltages of the second battery modules.

Each of the first battery and the second battery in the battery pack can incorporate a voltage droop into the respective low-voltage output to provide for passive balancing of discharging of the first battery and the second battery. For example, the first direct current to direct current converter can be configured to generate the first battery low-voltage output from the first battery modules low-voltage output to produce a first voltage droop in the first battery low-voltage output. The second direct current to direct current converter can be configured to generate the second battery low-voltage output from the second battery modules low-voltage output to produce a second voltage droop in the second battery low-voltage output.

In another aspect, a battery includes battery modules and a direct current to direct current convert. The battery modules are electrically connected in series to generate a first battery high-voltage output. The battery modules are electrically connected in parallel to generate a battery modules low-voltage output. The direct current to direct current converter is configured to generate a battery low-voltage output from the battery modules low-voltage output.

The battery can include any suitable number of the battery modules. For example, the battery can include two, three, four, five, six, or more of the battery modules.

The battery can include current flow-control components, such as diodes, to passively control discharging of the battery modules to preferentially discharge battery modules having a higher state of charge. For example, the battery can include current flow-control components (e.g., diodes) connected between the battery modules low-voltage output and the battery modules to block flow of current from the battery modules low-voltage output to battery modules and distribute contributions by the battery modules to the battery modules low-voltage output based on output voltages of the battery modules.

The battery can incorporate a voltage droop into the battery low-voltage output to provide for passive balancing of discharging of the battery and one or more other batteries. For example, the direct current to direct current converter can be configured to generate the battery low-voltage output from the battery modules low-voltage output to produce a voltage droop in the battery low-voltage output.

For a fuller understanding of the nature and advantages of the present invention, reference should be made to the ensuing detailed description and accompanying drawings.

DETAILED DESCRIPTION

In the following description, various embodiments of the present invention will be described. For purposes of explanation, specific configurations and details are set forth in order to provide a thorough understanding of the embodiments. However, it will also be apparent to one skilled in the art that the present invention may be practiced without the specific details. Furthermore, well-known features may be omitted or simplified in order not to obscure the embodiment being described.

Power distribution systems, battery packs, and batteries are presented that supply both high-voltage electrical power and low-voltage electrical power. In an illustrated embodiment, an aircraft power distribution system is configured to supply high-voltage electrical power to propulsion loads and low-voltage electrical power to system loads. The aircraft power distribution system employs batteries that include battery modules that are electrically connected in series to generate a high-voltage output used to power high-voltage propulsion loads and electrically connected in parallel to generate a low-voltage output used to power low-voltage system loads. The aircraft power distribution system employs redundant distribution of electrical power to provide for fail-saft distribution of power in the event of one or more failures in the aircraft power distribution system (e.g., battery failure, short circuits). The aircraft power distribution system employs load balancing to preferentially discharge battery modules having a higher state of charge over battery modules having a lower state of charge. The aircraft power distribution system includes battery packs. Each of the battery packs in the illustrated embodiment includes two batteries. While the battery packs and the batteries are described herein as components of the illustrated aircraft distribution system, any suitable number of the battery packs (e.g., one, two, three, or more) can be employed to store and supply electrical power in any suitable application. Likewise, any suitable number of the batteries (e.g., one, two, three, or more) can be employed to store and supply electrical power in any suitable application.

Figure 1:
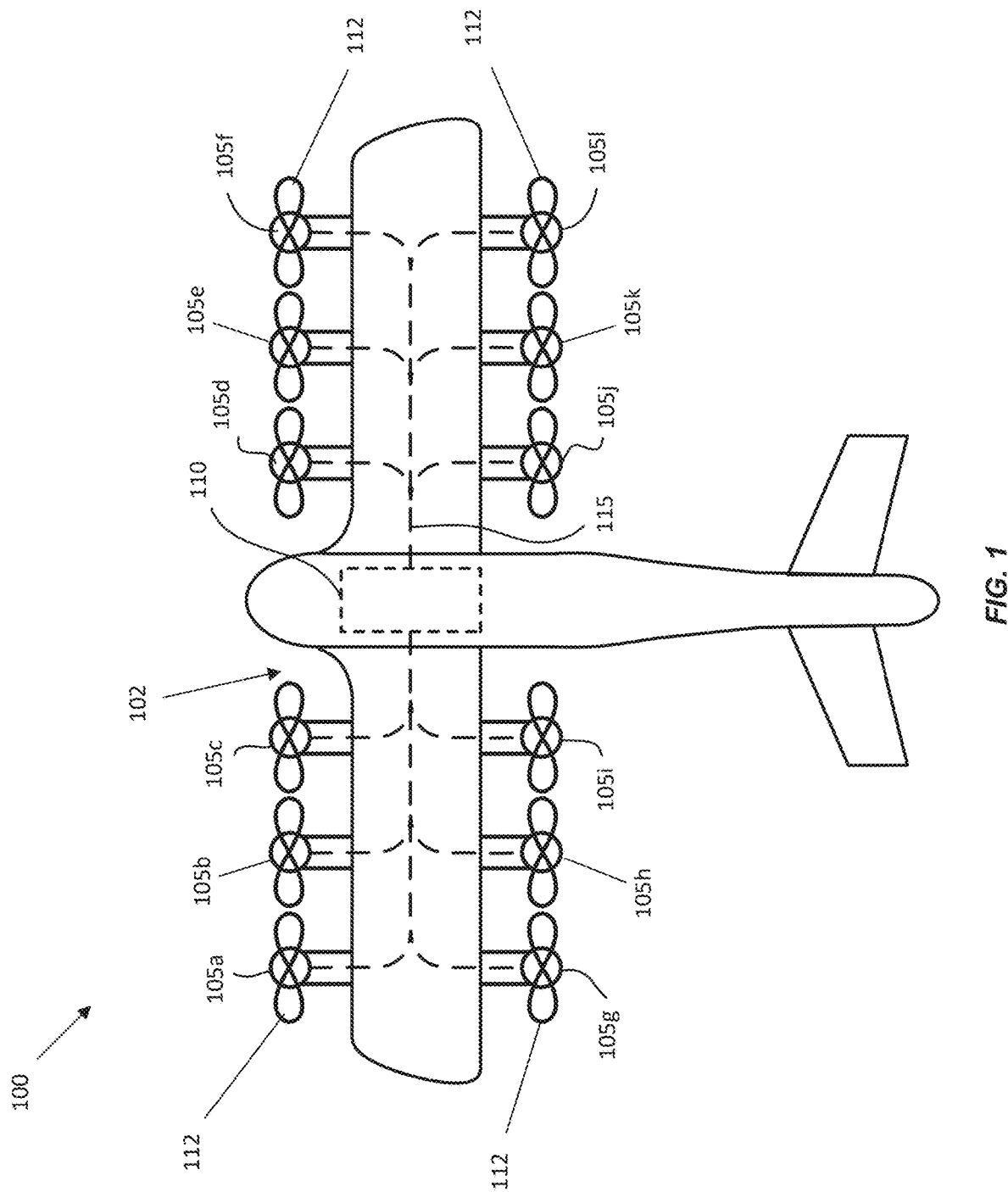
FIG. 1 depicts an electrically powered aerial vehicle that includes a power distribution system, in accordance with embodiments.

Turning now to the drawing figures in which similar reference identifiers are used to designate similar elements in the various figures, FIG. 1 depicts an electrically powered aerial vehicle 100 that includes a power distribution system 102, in accordance with embodiments. As shown in FIG. 1, the aerial vehicle 100 includes twelve motors 105a-105l. The power distribution system 102 includes six battery packs 110a, 110b, 110c, 110d, 110e, 110f, and a high-voltage distribution subsystem 115 via which the twelve motors 105a-105l are coupled to the battery packs 110a-f. In many embodiments, each of the twelve motors 105a-105l are used to drive propulsion fans 112 (e.g., tiltable lift/propulsion fans) and are configured to operate on a relatively high supply voltage (e.g., 792 V max), which is supplied by the battery packs 110a-f. The high-voltage subsystem 115 can have any suitable configuration for operatively coupling each of the motors 105a-105l to the battery packs 110a-f to meet airworthiness requirements.

In addition to the motors 105a-105l, the aerial vehicle 100 includes low-voltage systems that are also powered by the battery packs 110. The low-voltage systems include 24 motor controllers (MC) (two for each of the 12 motors to provide redundancy), 6 tilt actuators (T-act) (1 per each tilt mechanism used to tilt a corresponding pair of the motors mounted on a respective pylon), 4 aileron actuators (A-act), 2 elevator actuators (E-act), 1 rudder actuator (R-act), avionics units (A-units), passenger system line replaceable units (PAX-LRUs), lights, and miscellaneous other low-voltage systems. Each of the low-voltage systems is configured to operate on a relatively low voltage power (e.g., 28 V nominal).

Figure 2:
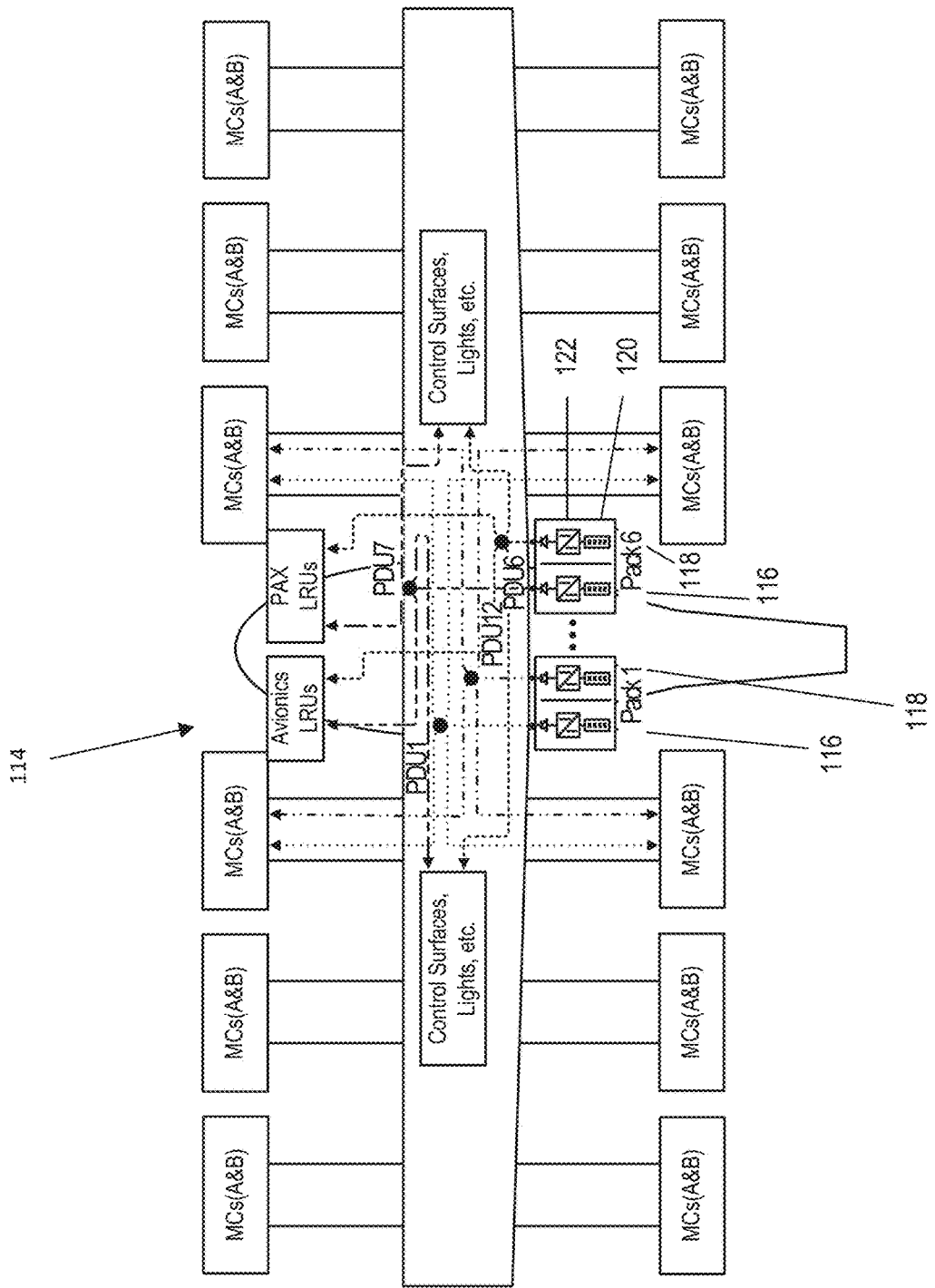
FIG. 2 schematically illustrates low-voltage distribution aspects of the power distribution system of FIG. 1.

FIG. 2 schematically illustrates high-level aspects of the supply of the low voltage power to the low-voltage systems. The power distribution system 102 includes a low-voltage distribution subsystem 114 via which the low voltage power is supplied to the low-voltage systems by the battery packs 110a-f. In the illustrated embodiment, the power distribution system 102 includes six of the battery packs 110a-f. Each of the battery packs 110 includes two battery assemblies 116, 118. Each of the two battery assemblies 116, 118 includes battery modules 120 and a direct current to direct current (DC/DC) converter 122. In one example embodiment, each of the battery assemblies 116, 118 includes 10 of the battery modules 120. Each of the battery assemblies 116, 118, however, can include any suitable number of the battery modules 120. In each of the battery assemblies 116, 118, the battery modules 120 are electrically coupled in parallel to supply a low-voltage input power (e.g., 36V to 75V) to the associated DC/DC converter 122. Each DC/DC converter 122 is configured to generate a low-voltage output power (e.g., 28V nominal) that is output from the battery assembly 116, 118. In the illustrated embodiment, the battery packs 110a-f have a total of 12 of the battery assemblies 116, 118.

In the illustrated embodiment, the power distribution system 102 includes 12 power distribution units (PDU1, PDU12, PDU2, PDU22, PDU3, PDU32, PDU4, PDU42, PDU5, PDU52, PDU6, PDU62). Each of the 12 power distribution units receives the low-voltage output power from an associated one of the 12 battery assemblies 116, 118. The 12 power distribution units be connected to the suitable subsets of the low-voltage systems to provide a suitable level of redundancy to the supply of power to the low-voltage systems. Each of the 12 power distribution units can include power monitoring elements (e.g., voltage sensors, current sensors) and power control elements (e.g., controlled power transistors for use in isolating failures of any one or more of the battery assemblies 116, 118).

Figure 3:
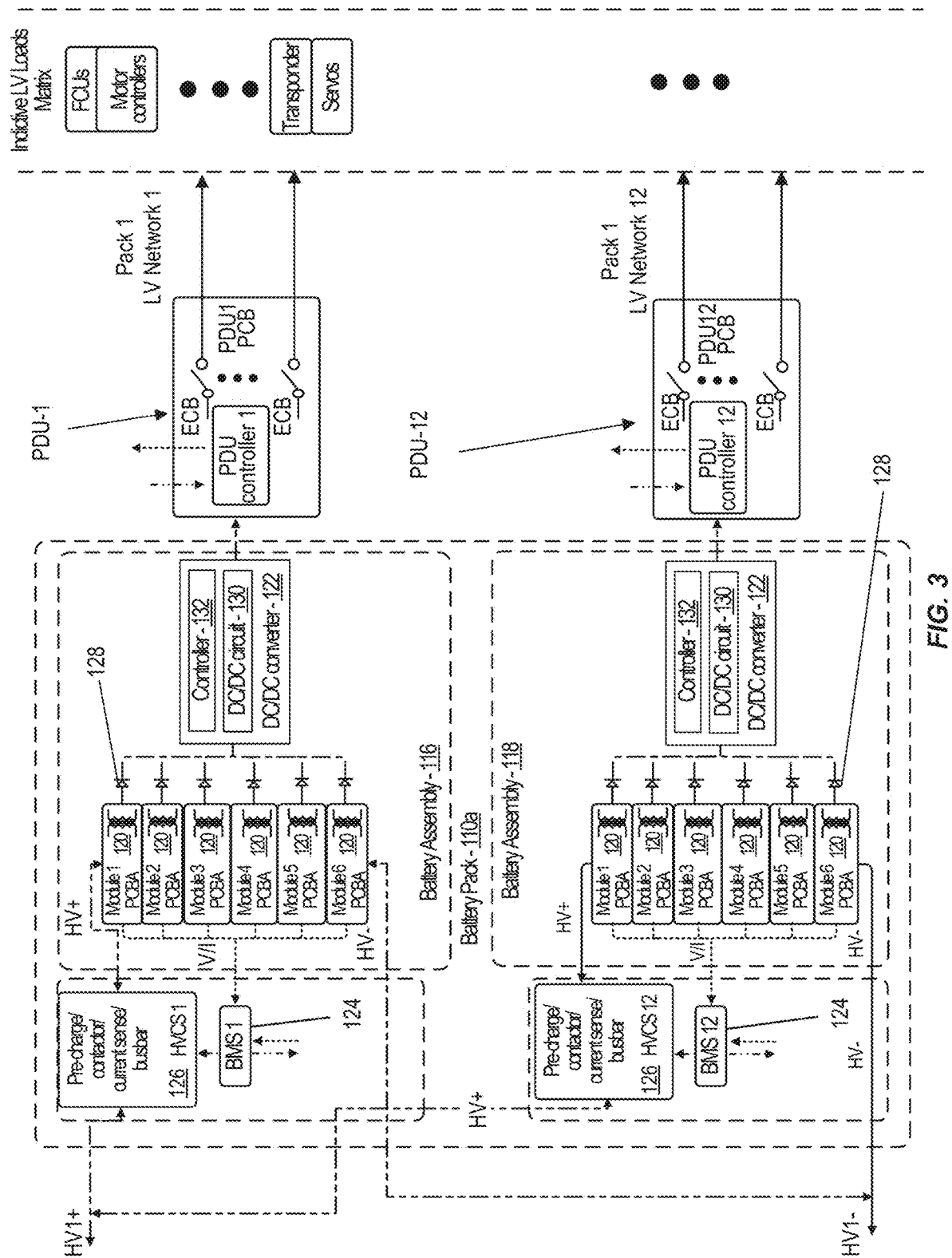
FIG. 3 schematically illustrates a battery pack of the power distribution system of FIG. 1.

FIG. 3 schematically illustrates one of the battery packs 110a-f and associated down-stream components of the low-voltage distribution subsystem. Each of the battery packs 110a-f includes the first battery assembly 116 and the second battery assembly 118. In the illustrated embodiment, each of the battery assemblies 116, 118 includes six of the battery modules 120, the associated DC/DC converter 122, a battery management system (BMS) 124, and a pre-charge contactor/current sense/busbar 126. While each of the battery assemblies 116, 118 includes six of the battery modules 120 in the illustrated embodiment, each of the battery assemblies 116, 118 can include any suitable number of the battery modules 120 such as, for example, 2, 3, 4, 5, 6, 7, 8, 9, 10, or more of the battery modules 120.

Output terminals for each of the battery modules 120 in each of the battery assemblies 116, 118 are electrically connected in series to generate the high-voltage power supplied to the twelve motors 105a-105l. The resulting high-voltage powers generated by the series connected battery modules 120 in the first and second batteries 116, 118 are electrically connected in parallel to produce a single high-voltage power output from each of the battery packs 110a-f.

The output terminals for each of the battery modules 120 in each of the battery assemblies 116, 118 are electrically connected in parallel to supply the low-voltage input power to the DC/DC converter 122. Each of the battery assemblies 116, 118 includes diodes 128 connected between the battery modules 120 and the DC/DC converter 122. Each of the diodes 128 blocks backflow of current to an associated one of the battery modules 120. The inclusion of the diodes 128 serves to preferentially discharge the battery module(s) 120 with a higher relative state of charge relative to the battery module(s) 120 with a lower relative state of charge since the battery module(s) 120 having the higher relative state of charge will output power at a relatively higher voltage thereby inhibiting output of power from the battery module (s) 120 having the relatively lower state or charge. Each of the battery modules 120 will have an internal resistance that results in a reduction of output voltage with increased power discharge rate, which further serves to distribute the discharging of the battery modules 120 based on both relative state of charge and total power supplied by the battery modules 120 to the DC/DC converter 122 at any point in time.

Figure 4:
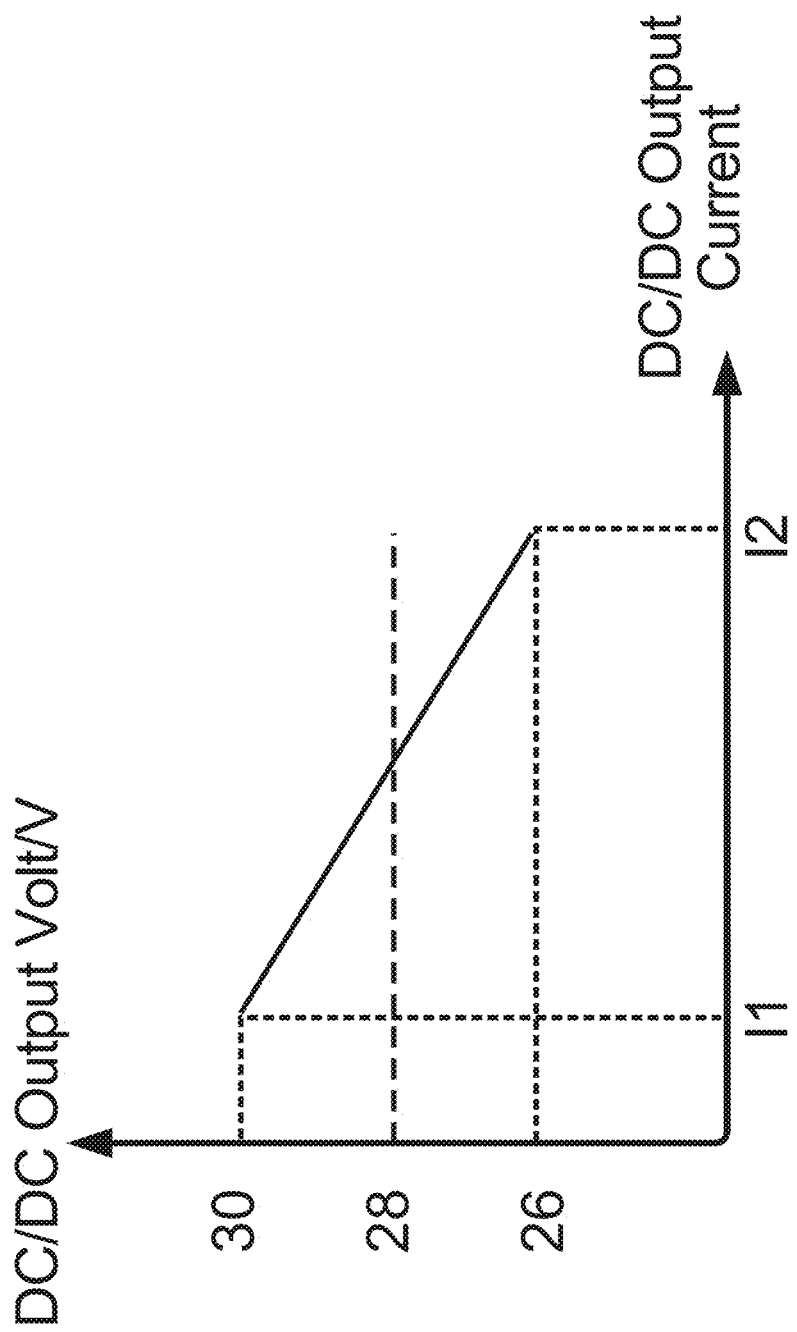
FIG. 4 shows an example voltage droop relationship that can be implemented by direct current to direct current converters of the battery pack of FIG. 3.

Each of the DC/DC converters 122 is configured to generate a low-voltage output power from the low-voltage input power and supply the low-voltage output power to the associated one of the power distribution units (PDU1-PDU62). Each of the DC/DC converters 122 includes a DC/DC circuit 130 and a controller 132. The DC/DC circuit 130 is configured to generate the low-voltage output power from the low-voltage input power. The controller 132 is configured to monitor the voltage and/or current of the low-voltage input power and control the DC/DC circuit 130 based on the low-voltage input power to generate the low-voltage output power over a range of voltages of the low-voltage input power. In many embodiments, each of the DC/DC converters 122 is configured to produce a voltage droop in the low-voltage output power to passively control distribution of power between the power distribution units, which supply low-voltage power the low-voltage systems of the aerial vehicle 100. FIG. 4 shows an example voltage droop relationship that can be implemented by each of the DC/DC converters 122.

Figure 5:
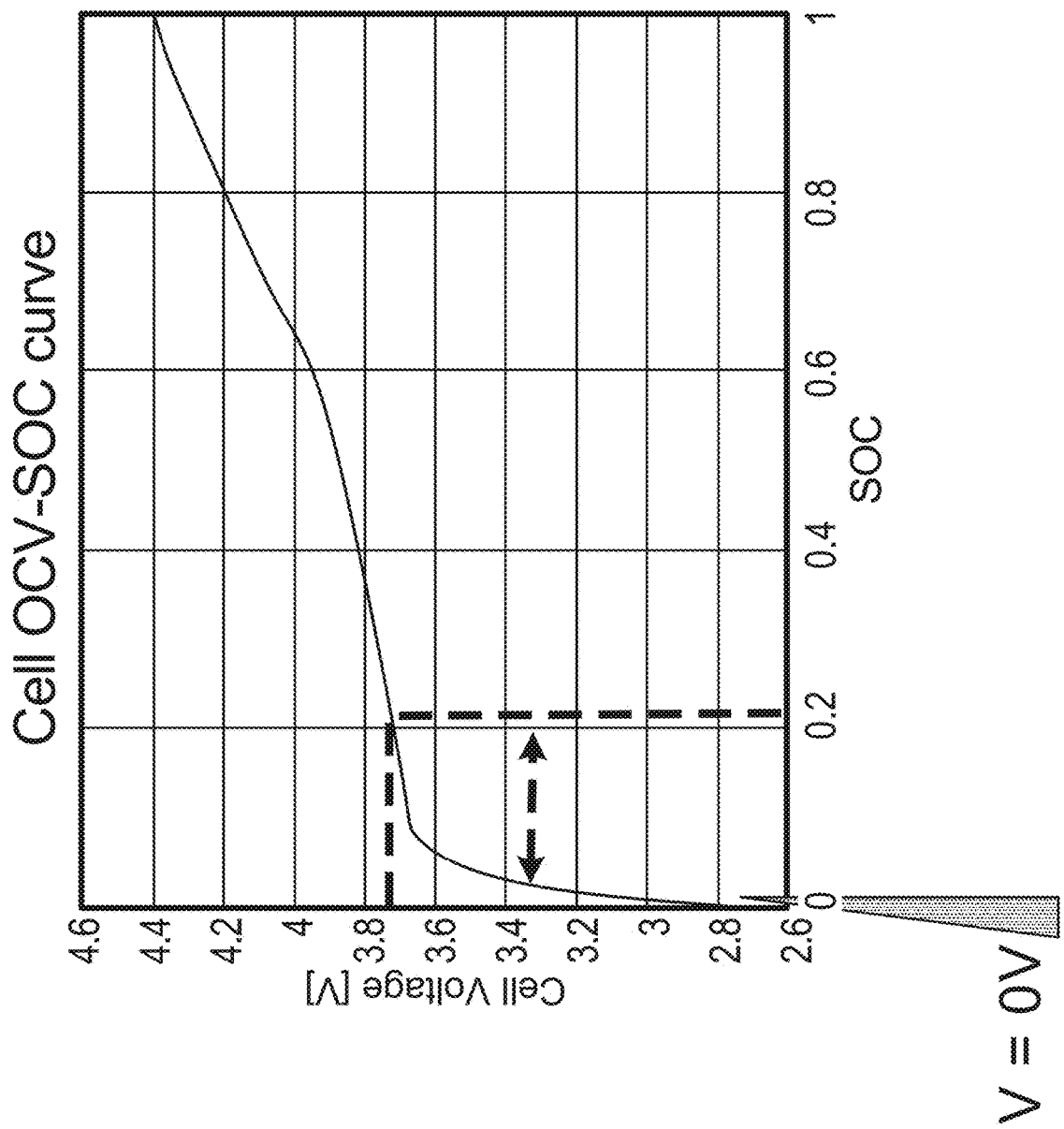
FIG. 5 shows a plot illustrating an example variation of battery module output voltage with state of charge of the battery module in battery modules of the battery pack of FIG. 3.
Figure 6:
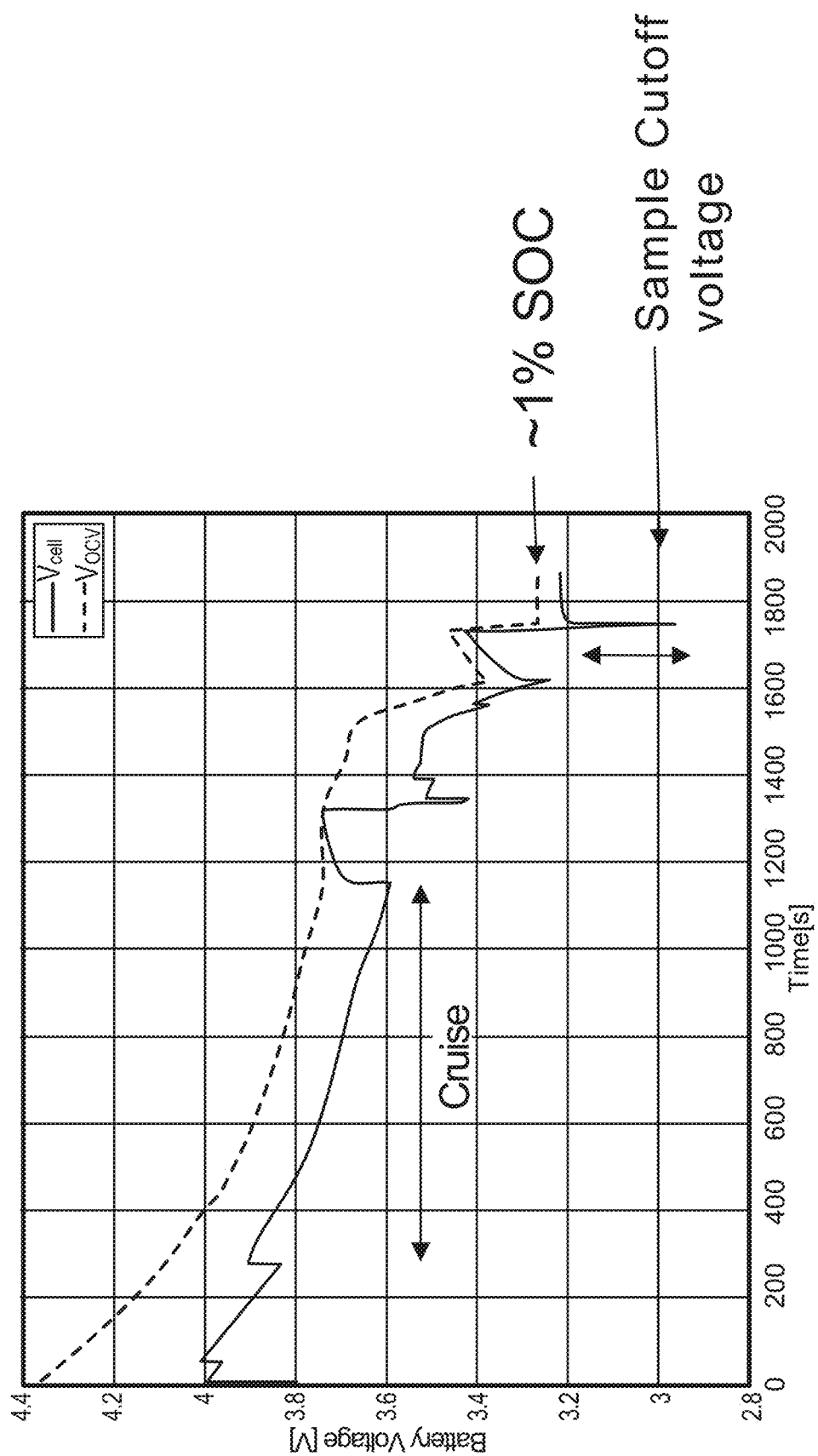
FIG. 6 shows a plot illustrating an example variation of battery module output voltage with flight duration for the power distribution system of FIG. 1.

The DC/DC converters 122 are configured to accommodate a range of different voltages of the low-voltage input power supplied by the battery modules 120 while still producing the low-voltage output power having the voltage as a function of current as shown in FIG. 4. For example, each DC/DC converter 122 can be configured to produce the low-voltage output power with a 30 Volt voltage at an output current (I–1) for any resulting voltages of the low-voltage input power in a suitable range (e.g., 36V to 75V), thereby accommodating the natural reduction in output voltage of the battery modules 120 that occurs during discharging of the battery modules 120 during high instantaneous rate of discharging due to internal resistance of the battery module 120 and due to cumulative reduction in the state of charge of the battery module 120. For example, FIG. 5 shows a plot illustrating an example variation of battery module output voltage with state of charge of the battery module 120. FIG. 6 shows a plot illustrating an example variation of battery module output voltage with flight duration for the power distribution system 102. The ability to generate suitable low-voltage output power for use by the low-voltage systems when the states of charge of the battery modules are relatively low, provides the ability to more completely utilize the electrical power stored in the battery packs 110*a-f* for operating the low-voltage systems, thereby providing for increased capability to support continued safe flight and landing of the aircraft when the state of charge of the battery packs 110*a-f* is low.

Although described herein in the context of the aerial vehicle 100, the power distribution system 102, one or more of the battery packs 110*a-f*, and/or one or more of the battery assemblies 116, 118 can be employed in any suitable electrically powered vehicle, system, or device. For example, any electrically powered vehicle that receives at least part of its power from one or more batteries can be used with embodiments of the disclosure. In some instances, embodiments of the disclosure are particularly well suited for use with aerial vehicles because of the reliability and failure isolation provided.

Other variations are within the spirit of the present invention. Thus, while the invention is susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. An aircraft power distribution system for supplying electrical power to high-voltage propulsion loads and low-voltage system loads, the system comprising:
    a battery pack comprising a first battery and a second battery, wherein the first battery comprises first battery modules and a first direct current to direct current converter, wherein the second battery comprises second battery modules and a second direct current to direct current converter, wherein the first battery modules are electrically connected in series to generate a first battery high-voltage output, wherein the second battery modules are electrically connected in series to generate a second battery high-voltage output, wherein the first battery high-voltage output and the second battery high-voltage output are used to supply power to a set of the high-voltage propulsion loads, wherein the first battery modules are electrically connected in parallel to generate a first battery modules low-voltage output, wherein the first direct current to direct current converter generates a first battery low-voltage output from the first battery modules low-voltage output, wherein the second battery modules are electrically connected in parallel to generate a second battery modules low-voltage output, and wherein the second direct current to direct current converter generates a second battery low-voltage output from the second battery modules low-voltage output;
    wherein the first battery high-voltage output and the second battery high-voltage output are connected in parallel to generate a battery pack high-voltage output that is supplied to the set of the high-voltage propulsion loads;
    a first power distribution unit that distributes the first battery low-voltage output to a first set of the low-voltage system loads; and
    a second power distribution unit that distributes the second battery low-voltage output to a second set of the low-voltage system loads.

2. The system of claim 1, wherein:
    the first battery comprises four of the first battery modules; and
    the second battery comprises four of the second battery modules.

3. The system of claim 2, wherein:
the first battery comprises five of the first battery modules; and
the second battery comprises five of the second battery modules.

4. The system of claim 3, wherein:
the first battery comprises six of the first battery modules; and
the second battery comprises six of the second battery modules.

5. The system of claim 1, wherein:
the first battery comprises first current flow-control components connected between the first battery modules low-voltage output and the first battery modules to block flow of current from the first battery modules low-voltage output to first battery modules and distribute contributions by the first battery modules to the first battery modules low voltage output based on output voltages of the first battery modules; and
the second battery comprises second current flow-control components connected between the second battery modules low-voltage output and the second battery modules to block flow of current from the second battery modules low-voltage output to second battery modules and distribute contributions by the second battery modules to the second battery modules low-voltage output based on output voltages of the second battery modules.

6. The system of claim 5, wherein each of the first current flow-control components and the second current flow-control components comprise diodes.

7. The system of claim 5, wherein:
the first direct current to direct current converter is configured to generate the first battery low-voltage output from the first battery modules low-voltage output to produce a first voltage droop in the first battery low-voltage output; and
the second direct current to direct current converter is configured to generate the second battery low-voltage output from the second battery modules low-voltage output to produce a second voltage droop in the second battery low-voltage output.

8. The system of claim 7, further comprising:
a second battery pack comprising a third battery and a fourth battery, wherein the third battery comprises third battery modules and a third direct current to direct current converter, wherein the fourth battery comprises fourth battery modules and a fourth direct current to direct current converter, wherein the third battery modules are electrically connected in series to generate a third battery high-voltage output, wherein the fourth battery modules are electrically connected in series to generate a fourth battery high-voltage output, wherein the third battery high-voltage output and the fourth battery high-voltage output are used to supply power to a second set of the high-voltage propulsion loads, wherein the third battery modules are electrically connected in parallel to generate a third battery modules low-voltage output, wherein the third direct current to direct current converter generates a third battery low-voltage output from the third battery modules low-voltage output, wherein the fourth battery modules are electrically connected in parallel to generate a fourth battery modules low-voltage output, and wherein the fourth direct current to direct current converter generates a fourth battery low-voltage output from the fourth battery modules low-voltage output;
a third power distribution unit that distributes the third battery low-voltage output to a third set of the low-voltage system loads; and
a fourth power distribution unit that distributes the fourth battery low-voltage output to a fourth set of the low-voltage system loads.

9. The system of claim 8, wherein the first power distribution unit, the second power distribution unit, the third power distribution unit, and the fourth power distribution unit are electrically connected with the low-voltage system loads so that each of the low-voltage system loads is supplied power by at least two of the first power distribution unit, the second power distribution unit, the third power distribution unit, and the fourth power distribution unit.

10. The system of claim 8, wherein:
the third battery comprises four of the third battery modules; and
the fourth battery comprises four of the fourth battery modules.

11. The system of claim 10, wherein:
the third battery comprises five of the third battery modules; and
the fourth battery comprises five of the fourth battery modules.

12. The system of claim 11, wherein:
the third battery comprises six of the third battery modules; and
the fourth battery comprises six of the fourth battery modules.

13. The system of claim 8, wherein the third battery high-voltage output and the fourth battery high-voltage output are connected in parallel to generate a second battery pack high-voltage output that is supplied to the second set of the high-voltage propulsion loads.

14. The system of claim 8, wherein:
the third battery comprises third current flow-control components connected between the third battery modules low-voltage output and the third battery modules to block flow of current from the third battery modules low-voltage output to third battery modules and distribute contributions by the third battery modules to the third battery modules low-voltage output based on output voltages of the third battery modules; and
the fourth battery comprises fourth current flow-control components connected between the fourth battery modules low-voltage output and the fourth battery modules to block flow of current from the fourth battery modules low-voltage output to fourth battery modules and distribute contributions by the fourth battery modules to the fourth battery modules low-voltage output based on output voltages of the fourth battery modules.

15. The system of claim 14, wherein each of the third current flow-control components and the fourth current flow-control components comprise diodes.

16. The system of claim 14, wherein:
the third direct current to direct current converter is configured to generate the third battery low-voltage output from the third battery modules low-voltage output to produce a third voltage droop in the third battery low-voltage output; and
the fourth direct current to direct current converter is configured to generate the fourth battery low-voltage output from the fourth battery modules low-voltage output to produce a fourth voltage droop in the fourth battery low-voltage output.

* * * * *